Patented Apr. 16, 1935

1,997,658

UNITED STATES PATENT OFFICE 1,997,658

TANNING SKIN SUBSTANCES

Adolf Schubert, Milburn, N. J.

No Drawing. Application August 30, 1932,
Serial No. 631,103

10 Claims. (Cl. 149—5)

This invention relates to the tanning of skins and the like, and one of its important objects is to provide a tanning agent and process which will produce white leather. A further object is to provide a taning agent and process which will produce leather capable of being easily dyed, especially by means of dyes which form colored lakes in or upon the material. To these and other ends the invention comprises the novel features hereinafter described.

In my improved tanning process I use a titanium salt, which is produced by fusion of a mixture of titanium oxide and one or more alkali metal compounds of sulfur, as for example sodium bisulfate and bisulfite. The titanium oxide used is preferably hydrated oxide which has not been calcined, but in the specific examples of my invention given below, the amount of the oxide is given on the dry or calcined basis.

In one example of preparing the titanium tanning agent I convert titanium oxide ($TiO_2$) into a titanium-sulfur compound, apparently a sulfate the basicity of which can be varied by varying the proportions of the reagents, by fusing therewith a sulfur compound of sodium or potassium. Preferably I fuse with 16 parts titanium oxide, 60 parts anhydrous sodium bisulfate ($NaHSO_4$), and to the fusion I add about 10.5 parts of sodium bisulfite ($NaHSO_3$) and continue the fusion until oxidation of the bisulfite is completed. The final product is mixed with water and is then used to treat the skin substance, the latter being more or less acid, preferably at a pH about 3.5. In this step the concentration of the liquor is, by preference, such as will give it a titanium content (estimated as $TiO_2$) of about 2 per cent of the weight of the drained skins. This treatment may require several hours time, with agitation, after which the pH of the liquor is brought to about 5.4 by the addition of a mild alkali, as for example borax, sodium carbonate or bicarbonate, preferably the latter, followed by further agitation for a short time. The result is a clear white leather which can be finished by any well known procedure such as is applicable to chrome-tanned leather. The product of my process has the further advantage that it can be readily dyed, the titanium compound in the leather reacting with the dyestuff to form a lake the color of which depends, of course, upon the dyestuff employed.

The proportions of the reagents employed in preparing the tanning agent may vary considerably. For example, the amount of the oxide and bisulfite being the same as in the example given I may use less than 40 parts of the sodium bisulfate, say 36 parts, or I may use more, as for example 48 or, say, 72 parts. Or I may substitute sodium sulfite ($Na_2SO_3$) for the bisulfite, using, say, about 12.5 parts of the sulfite. I may also substitute about 16 parts sodium thiosulfate ($Na_2S_2O_3$) for the bisulfite. Another salt that may be used is hydrosulfite ($Na_2S_2O_4$). More specifically I prefer the following:

(a) 60 parts anhydrous sodium bisulfate ($NaHSO_4$), 16 parts titanium oxide ($TiO_2$), 10.4 parts sodium bisulfite ($NaHSO_3$).

(b) 36 parts anhydrous bisulfate, 16 parts titanium oxide, 10.4 parts bisulfite.

(c) 48 parts anhydrous bisulfate, 16 parts titanium oxide, 10.4 parts bisulfite.

(d) 72 parts bisulfate, 16 parts titanium oxide, 12.6 parts sodium sulfite ($Na_2SO_3$).

(e) 72 parts bisulfate, 16 parts titanium oxide, 15.8 parts anhydrous sodium thiosulfate ($Na_2S_2O_3$).

In example (e) the mixture can be kept in the fused state until sulfur ceases to come off (as dioxide, $SO_2$), but if desired the mass may be allowed to solidify before evolution of $SO_2$ begins, leaving in the product the sulfur liberated in the reaction.

It is to be understood that the invention is not limited to the details herein specifically stated, as these can be varied without departure from its spirit.

I claim—

1. In the art of tanning skin substances, fusing an anhydrous bisulfate of sodium or potassium with titanium oxide, fusing the product thereof with a bisulfite of sodium or potassium, and treating the skin substance with the resulting product in water.

2. In the art of tanning skin substances, treating the skin substance as in claim 1, with the skin substance at a pH of about 3.5, and then raising the pH value of the liquor to about 5.4.

3. The process set forth in claim 1, in which the titanium concentration of the liquor, estimated as titanium oxide, is about 2 per cent of the weight of the drained skin substance.

4. In the art of tanning skin substances, fusing about 36 to about 72 parts anhydrous sodium or potassium bisulfate with about 16 parts titanium oxide, fusing the product thereof with sodium or potassium bisulfite, and treating the skin substance with the product of the fusion.

5. In the art of tanning skin substances, preparing a tanning agent by fusing with titanium oxide sodium or potassium bisulfate, and fusing the product with sodium or potassium sulfite.

6. In the art of tanning skin substances, preparing a tanning agent by fusing with titanium oxide sodium or potassium anhydrous bisulfate in the presence of sodium or potassium bisulfite.

7. In the art of tanning skin substances, preparing a tanning agent by fusing with titanium oxide sodium or potassium anhydrous bisulfate in the presence of sodium or potassium thiosulfate.

8. A tanning agent having the composition resulting from the fusion of titanium oxide with sodium or potassium bisulfate in the presence of and in intimate contact with a sulfur compound of sodium or potassium selected from the class composed of bisulfite, sulfite, thiosulfate, and hydrosulfite.

9. In the art of tanning skin substances, preparing a tanning agent by fusing titanium oxide with sodium or potassium bisulfate and with a sulfur compound of sodium or potassium selected from the class composed of bisulfite, sulfite, thiosulfate, and hydrosulfite, and treating the skin substance with the resulting tanning agent in water, with the skin substance at a pH of substantially less than 7.

10. A tanning agent having the composition resulting from the fusion of titanium oxide with sodium or potassium, anhydrous bisulfate in the presence of and in intimate contact with sodium or potassium bisulfite.

ADOLF SCHUBERT.